(12) United States Patent
Oh

(10) Patent No.: US 6,462,747 B1
(45) Date of Patent: Oct. 8, 2002

(54) TEXTURE MAPPING SYSTEM

(75) Inventor: Kun-Chang Oh, Seoul (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/458,053

(22) Filed: Dec. 10, 1999

(30) Foreign Application Priority Data

Dec. 15, 1998 (KR) .............................................. 98-55126

(51) Int. Cl.[7] .............................................. G06T 11/40
(52) U.S. Cl. ........................ 345/552; 345/557; 345/566; 345/574; 345/582
(58) Field of Search ................................ 345/552, 557, 345/564, 566–568, 572–574, 531, 571, 540, 582; 711/118, 127, 128, 200, 202

(56) References Cited

U.S. PATENT DOCUMENTS

| 5,388,206 A | 2/1995 | Poulton et al. | |
| 5,548,709 A | 8/1996 | Hannah et al. | |
| 5,550,961 A | * 8/1996 | Chimoto | 345/571 |
| 5,606,650 A | * 2/1997 | Kelley et al. | 345/552 |
| 5,831,640 A | * 11/1998 | Wang et al. | 345/552 |

* cited by examiner

Primary Examiner—Kee M. Tung
(74) Attorney, Agent, or Firm—Birch, Stewart, Kolasch & Birch, LLP

(57) ABSTRACT

The present invention relates a texture mapping system which can access texture data in parallel. The texture mapping system includes: a memory controller; a main memory storing filtered texture images; a cache memory receiving data of the texture image from the main memory, and separately storing texture data in odd-number columns and even-number columns; a texture address converter converting an address from the memory controller, and generating a read/write address of the cache memory; and an interpolator interpolating the texture data outputted from the cache memory, and forming a pixel data. Accordingly, when the texture data is mapped according to a bi-linear filtering method and the like in the three-dimensional graphic system, the cache memory is accessed as many as a half of the number of the necessary texture data, thereby improving the graphic performance.

17 Claims, 3 Drawing Sheets

TEXTURE MAPPING SYSTEM

BACKGROUND OF THE INVENTION

1. Field of the Invention

The present invention relates to a computer graphic system, and in particular to a texture mapping system which can access texture data in parallel.

2. Description of the Background Art

In general, a computer graphic system is employed to display various graphical objects, such as points, lines, polygons and tree-dimensional objects, on a screen. In addition, in the computer graphic system, a texture mapping system (semiconductor chip) receives various texture data, and performs a texture mapping operation.

FIG. 1 is a block diagram illustrating a conventional texture mapping system. As shown therein, the texture mapping system includes: a memory controller 10 performing various control operations; a main memory 11 storing filtered texture images; a cache memory 12 storing a recently-used texture data; and an interpolator 13 forming a pixel from the texture data read from the cache memory 12.

The main memory 11 consists of a DRAM array, and the cache memory 12 has a sequential storage structure as shown in FIG. 3.

The operation of the conventional texture mapping system will now be described with reference to the accompanying drawings.

All filtered texture images applied to the graphic are stored in the main memory 11.

When a read address is inputted from a Rasterizer (not shown), the memory controller 10 accesses a specific row of the main memory 11, and outputs a write address to the cache memory 12 at the same time. As a result, data of the texture image filed in the main memory 11 as M×N bits as shown in FIG. 2 are sequentially stored in the cache memory 12 as shown in FIG. 3. Here, one texture data is allotted to one write address. Accordingly, the above-described operation is repeatedly performed, and thus the texture images stored in the main memory 11 are stored in the cache memory 12 as the texture data.

In the texture mapping, the memory controller 10 outputs the read address to the cache memory 12, thereby accessing the texture data. One texture data is allotted to one read address. Accordingly, the interpolator 13 interpolates the texture data read from the cache memory 12, and forms and outputs the pixel data to a display unit.

However, in a three-dimensional graphic, the number of the texture data which the interpolator 13 must read from the cache memory 12 in regard to one pixel is varied according to filtering methods. For example, in a point sampling mode, the interpolator 13 reads one texture data from the cache memory 12, and forms one pixel data. In a bi-linear sampling mode, the interpolator 13 reads four adjacent texture data from the cache memory 12, and forms one pixel data.

Therefore, in the point sampling mode, the memory controller 10 accesses the cache memory 12 one time in order to process one pixel. On the other hand, in the bi-linear sampling mode, the memory controller 10 accesses the cache memory 12 four times in order to process one pixel. As a result, the access number to the cache memory 12 is more increased in the bi-linear sampling mode that the point sampling mode, thus deteriorating the three-dimensional graphic performance approximately by four times.

Accordingly, in the conventional texture mapping system, in case a few texture data are necessary in regard to one pixel (bi-linear or tri-linear), the cache memory must be accessed as many as the number of the texture data, which results in decreased performance of the three-dimensional graphic system.

SUMMARY OF THE INVENTION

It is therefore a primary object of the present invention to provide a texture mapping system which can improve three-dimensional graphic performance.

It is another object of the present invention to provide a texture mapping system which can read two texture data in parallel per access.

In order to achieve the above-described objects of the present invention, there is provided a texture mapping system including: a memory controller; a main memory storing filtered texture images; a cache memory receiving data of the texture image from the main memory, and separately storing texture data in odd-number columns and even-number columns; a texture address converter converting an address from the memory controller, and generating a read/write address of the cache memory; and an interpolator interpolating the texture data outputted from the cache memory, and forming a pixel data.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
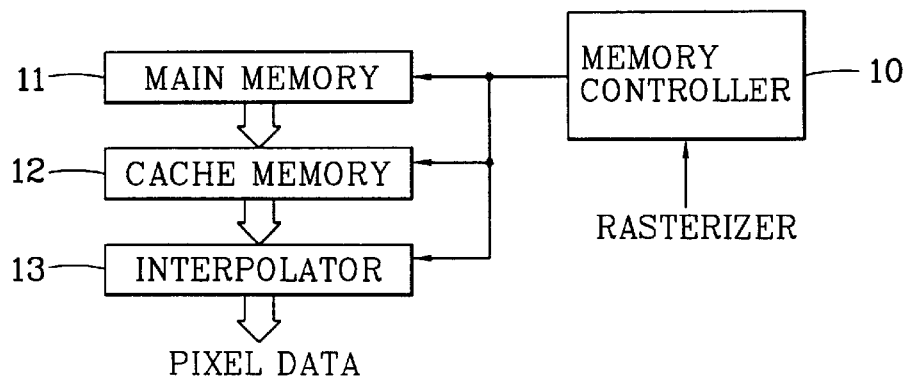
FIG. 1 is a block diagram illustrating a conventional texture mapping system.
Figure 2:
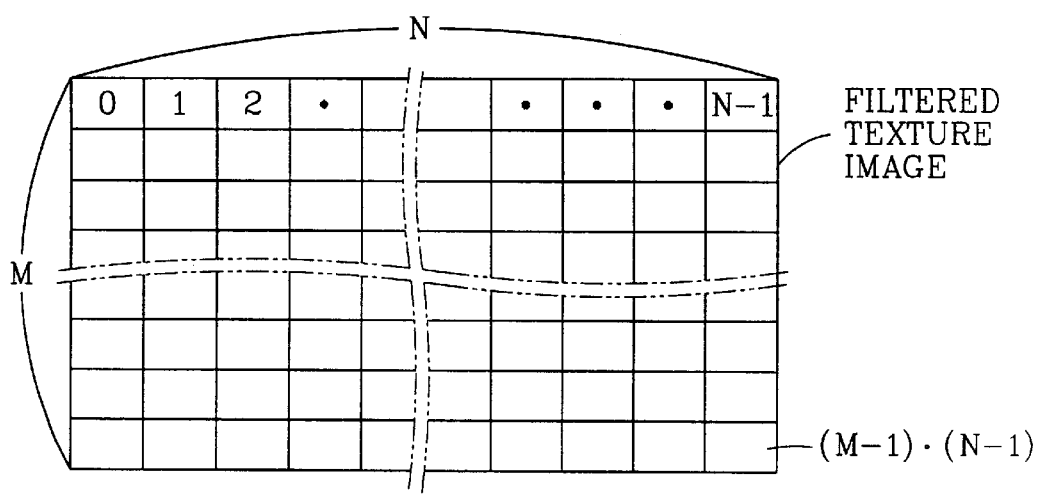
FIG. 2 depicts data of a texture image stored in a conventional main memory.
Figure 3:
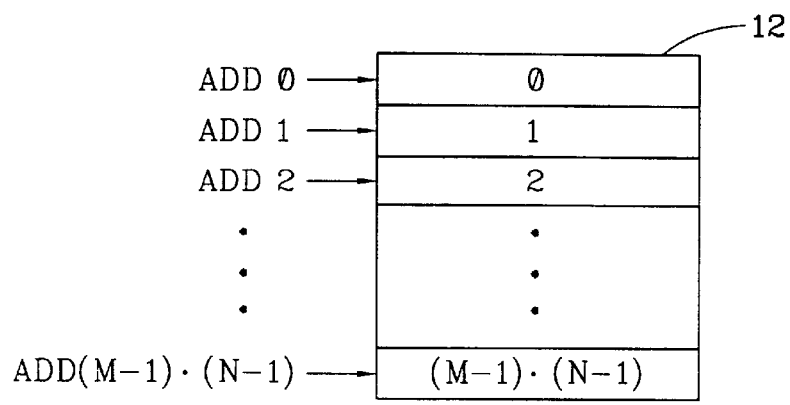
FIG. 3 depicts a structure of a cache memory in FIG. 1.
Figure 4:
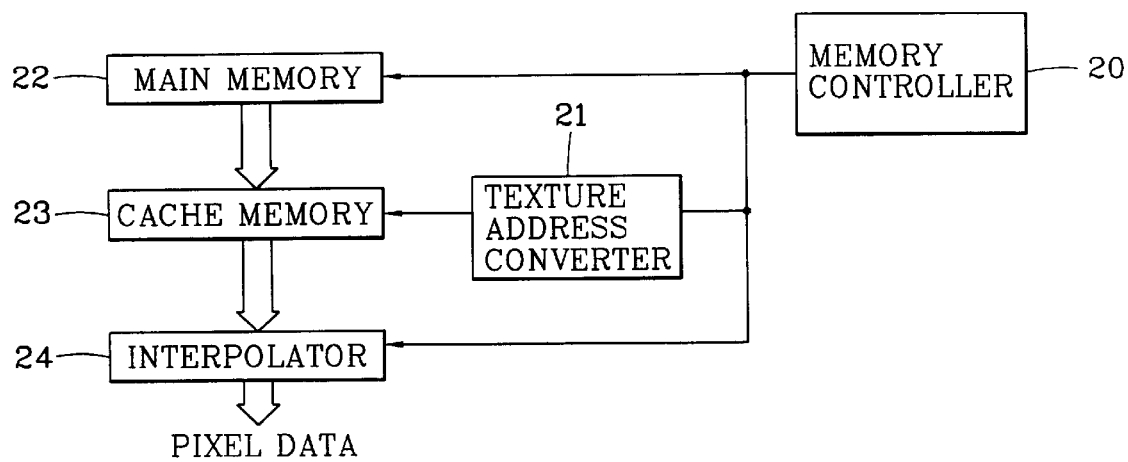
FIG. 4 is a block diagram illustrating a texture mapping system in accordance with the present invention.

FIG. 3 is a block diagram illustrating a texture mapping system in accordance with the present invention. As depicted therein, the texture mapping system includes a memory controller 20, a texture address converter 21, a main memory 22, a cache memory 23 and an interpolator 24. The memory controller 20, the main memory 22 and the interpolator 24 are identical in constitution and operation to the conventional art.

Figure 6:
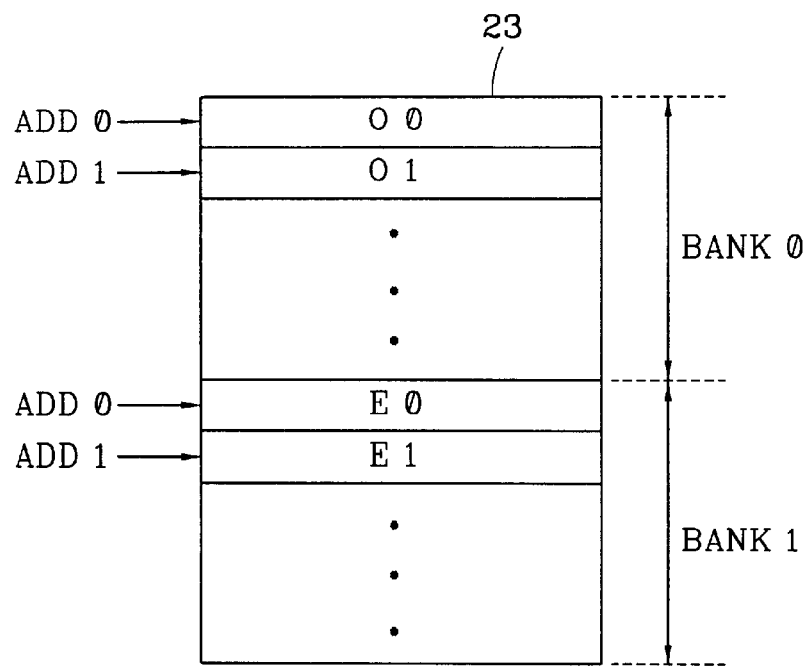
FIG. 6 depicts a structure of a cache memory in FIG. 4.

The texture address converter 21 counts column addresses outputted from the memory controller 20, generates a write address appropriate to two banks Bank0, Bank1 and two columns (odd- and even-number columns), and outputs it to the cache memory 23. In addition, the texture address converter 21 converts a read address of the cache memory 23 inputted from the memory controller 20 in the texture mapping into two adjacent read addresses. As illustrated in FIG. 6, the cache memory 23 has a structure of the two banks Bank0, Bank1. The texture data in odd-number columns of a texture image stored in the main memory 22 are stored in the bank Bank0, and the texture data in even-number columns are stored in the bank Bank1.

The operation of the texture mapping system in accordance with the present invention will now be described.

Figure 5:
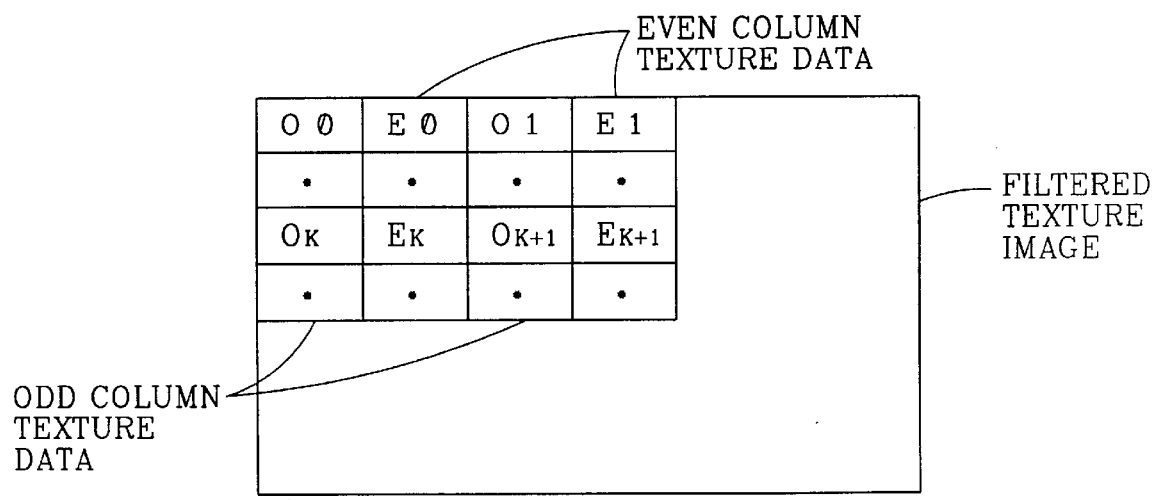
FIG. 5 depicts data in odd-number columns and data in even-number columns of a texture image stored in a main memory in FIG. 4.

The memory controller 20 generates a row address and a column address to the main memory 22, and accesses the data of the texture image. Here, as shown in FIG. 5, the texture image stored in the main memory 22 is divided into the texture data in the odd- and even-number columns.

The texture address converter 21 counts the column address inputted to the main memory 22, and generates the write address of the cache memory 23 appropriate to the two banks Bank0, Bank1 and the two columns (odd- and even-number columns). Here, one texture data is allotted to the cache memory 23 by the write address. As a result, as illustrated in FIG. 6, the texture data in the odd-number columns stored in the main memory 22 are sequentially stored in the bank Bank0, and the texture data in the even-number columns are sequentially stored in the bank Bank1, by the write address outputted from the texture address converter 21. At this time, the read/write address of a storing region is identical in the two banks Bank0, Bank1.

During the texture mapping, the memory controller 20 outputs a read address ADD0 of the cache memory 12 to the texture address converter 21, the read address ADD0 being positioned at the left end among the texture data in the identical row of the texture image of the main memory 22. The texture address converter 21 discriminates whether the texture data corresponding to the inputted read address ADD0 is stored in the bank Bank0 or bank Bank1, and according to the discrimination result, outputs two read addresses ADD0, ADD1 to the bank Bank0 or bank Bank1 of the cache memory 23. In addition, the texture address converter 21 discriminates a read address of the redundant texture data, and does not generate it.

Figure 7:
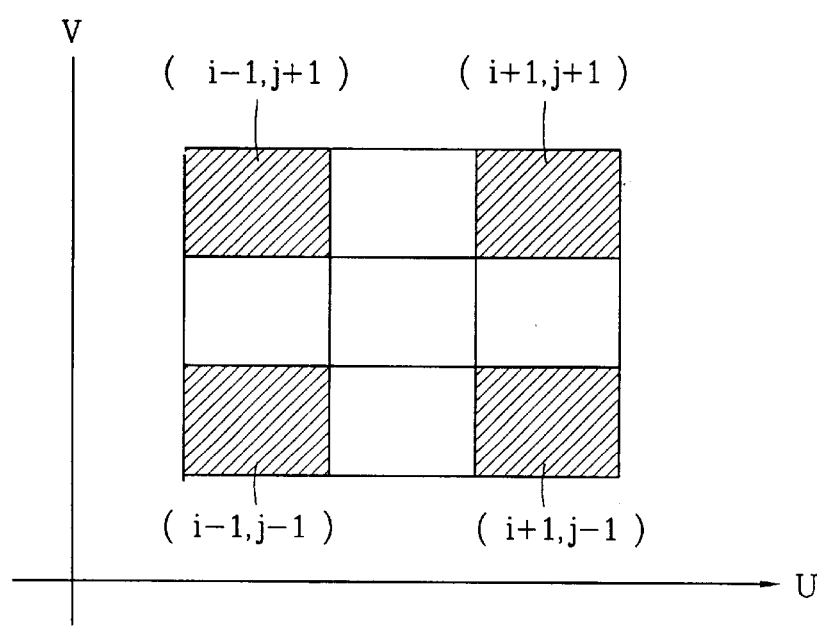
FIG. 7 shows an access process of the cache memory when one pixel data is formed by reading four texture data.

For convenience's sake, it is presumed that the texture data corresponding to the read address ADD0 is stored in the bank Bank0. In this case, the texture data 00, 01 in the odd-number columns stored in the bank Bank0 are outputted by the two read addresses ADD0, ADD1 outputted from the texture address converter 21. As a result, the interpolator 24 forms one pixel data by using the two read texture data 00, 01. Here, it is exemplified the case that the pixel data corresponding to co-ordinates (i, j) is interpolated from the texture image, as shown in FIG. 7.

Firstly, in order to interpolate the pixel data corresponding to co-ordinates (i, j), four texture data (i−1, j+1), (i+1, j+1), (i−1, j−1), (i+1, j−1) must be read from the cache memory 23. Here, it is presumed that the read addresses of the texture data (i−1, j+1), (i+1, j+1), (i−1, j−1), (i+1, j−1) are ADD0 to ADD3.

The four texture data are stored in the identical bank of the cache memory 23. In the corresponding bank, the texture data (i−1, j+1), (i+1, j+1) and the texture data (i−1, j−1), (i+1, j−1) are adjacent to each other, respectively. Accordingly, when accessing the two texture data (i−1, j+1), (i+1, j+1), the memory controller 20 outputs the read address ADD0 of the texture data (i−1, j+1) positioned at the left end among the texture data in the identical row of the texture image of the main memory 22. The texture address converter 21 receives the read address ADD0, and outputs the two adjacent read addresses ADD0, ADD1 to the cache memory 23. As a result, the two adjacent texture data (i−1, j+1), (i+1, j+1) stored in the identical bank of the cache memory 23 are inputted to the interpolator 24.

The memory controller 20 outputs the read address ADD2 of the texture data (i−1, j−1) in order to access the two texture data (i−1, j−1), (i+1, j−1). The texture address converter 21 receives the read address ADD2, and outputs the two read addresses ADD2, ADD3 to the cache memory 23. Accordingly, the two adjacent texture data (i−1, j−1), (i+1, j−1) stored in the identical bank of the cache memory 23 are read by the read addresses ADD2, ADD3, and inputted into the interpolator 24.

The interpolator 24 interpolates the four texture data (i−1, j+1), (i+1, j+1), (i−1, j−1), (i+1, j−1), and thus forms one pixel data (i, j). The pixel data (i, j) is finally displayed on a display unit.

According to the present invention, in case four texture data are necessary in regard to one pixel, the cache memory may be accessed merely two times, not four times. In addition, the texture address converter is not limited to the two read addresses, but generates the read address of the corresponding texture data in accordance with the filtering modes.

As discussed earlier, in accordance with the texture mapping system of the present invention, when the texture data is mapped according to a bi-linear filtering method and the like in the three-dimensional graphic system, the cache memory is accessed as many as a half of the number of the texture data necessary to form one pixel, thereby improving the graphic performance by two times. Furthermore, the texture address converter is not limited to the two addresses, but generates the address of the corresponding texture data in accordance with filtering modes.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A texture mapping system, comprising:
   a memory controller;
   a main memory for storing filtered texture images;
   a cache memory for receiving data of the texture image from the main memory, and separately storing texture data in odd-number columns and even-number columns;
   a texture address converter for converting an address from the memory controller, and generating a read/write address of the cache memory; and
   an interpolator for interpolating the texture data outputted from the cache memory, and forming a pixel data.

2. The texture mapping system according to claim 1, wherein the cache memory consists of first and second banks, and the respective banks store the texture data in the odd-number columns and the texture data in the even-number columns.

3. The texture mapping system according to claim 1, wherein the main memory consists of a DRAM array, and the texture address converter counts column addresses of the main memory outputted from the memory controller, and generates a write address.

4. The texture mapping system according to claim 3, wherein the cache memory consists of first and second banks, and the write address is divided into write addresses for the first and second banks according to a counted value.

5. The texture mapping system according to claim 4, wherein the first and second banks are identical in constitution, and the write addresses for the first and second banks are identically set.

6. The texture mapping system according to claim 1, wherein the memory controller outputs to the texture address converter the read address of the texture data positioned at the left end among the texture data in an identical row of the texture image of the main memory during the texture mapping.

7. The texture mapping system according to claim 1, wherein the texture address converter receives the read address from the memory controller, and generates first and second read addresses, and the cache memory outputs two texture data according to the first and second read addresses.

8. The texture mapping system according to claim 7, wherein the first read address is an inputted read address, the second read address is an address increased than the first read address by 1, and the two texture data are positioned in the identical bank.

9. The texture mapping system according to claim 1, wherein the texture address converter generates the write address of the corresponding texture data according to filtering modes, and the corresponding texture data are stored in the identical bank.

10. The texture mapping system according to claim 9, wherein the texture address converter discriminates an address of the redundant texture data, and does not generate the address of the redundant texture data.

11. A texture mapping system comprising:

a memory controller;

a cache memory consisting of first and second banks, storing texture data in odd-number columns outputted from a main memory in the first bank, and storing texture data in even-number columns in the second bank; and a texture address converter for counting column addresses outputted from the memory controller, generating a write address of the cache memory, and converting a read address outputted from the memory controller into first and second read addresses of the cache memory.

12. The texture mapping system according to claim 11, further comprising an interpolator for interpolating the texture data outputted from the cache memory, and forming a pixel data.

13. The texture mapping system according to claim 11, wherein the main memory consists of a DRAM array, and is accessed by row and column addresses outputted from the memory controller.

14. The texture mapping system according to claim 11, wherein the first and second banks are identical in constitution, the write address is divided into write addresses for the first and second banks according to the counted value of the column address, and the write addresses for the first and second banks are identically set.

15. The texture mapping system according to claim 11, wherein the memory controller outputs to the texture address converter the read address of the texture data positioned at the left end among the texture data in an identical row of the texture image of the main memory during the texture mapping.

16. The texture mapping system according to claim 11, wherein the cache memory outputs two adjacent texture data in the identical bank according to the first and second read addresses.

17. The texture mapping system according to claim 11, wherein the first read address is an inputted read address, and the second read address is an address increased than the first read address by 1.

* * * * *